Feb. 24, 1959 R. K. ORTHUBER ET AL 2,875,350
RADIATION AMPLIFIER CONSTRUCTION
Original Filed July 6, 1954
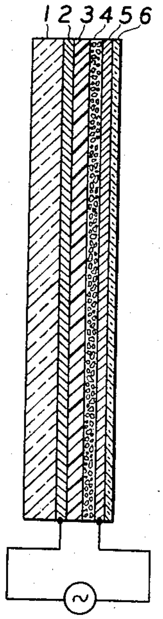
FIG. 1
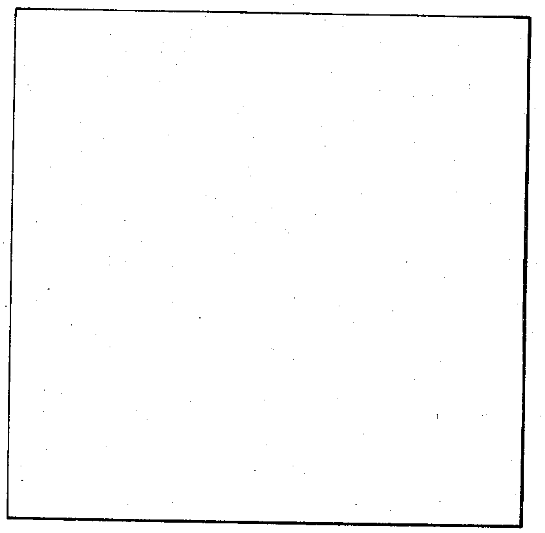
FIG. 3
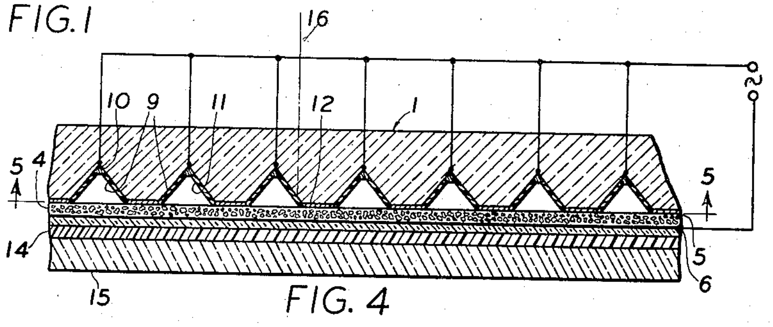
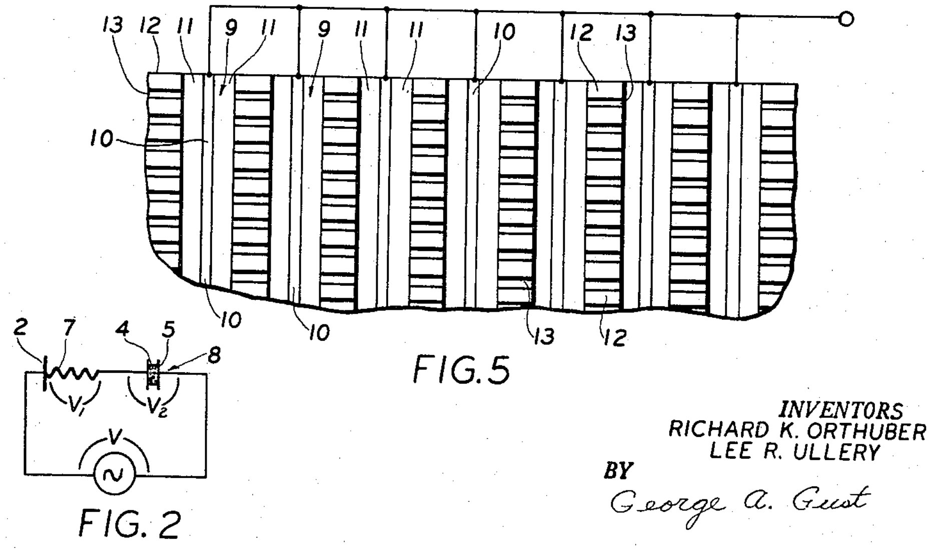
FIG. 5, FIG. 2
INVENTORS
RICHARD K. ORTHUBER
LEE R. ULLERY
BY George A. Gust
ATTORNEY United States Patent Office 2,875,350 Patented Feb. 24, 1959

2,875,350

RADIATION AMPLIFIER CONSTRUCTION

Richard K. Orthuber, Sepulveda, Calif., and Lee R. Ullery, Greenwich, Conn., assignors to International Telephone and Telegraph Corporation Continuation of application Serial No. 441,595, July 6, 1954. This application September 9, 1957, Serial No. 682,982

3 Claims. (Cl. 250—213)

This is a continuation of application Serial No. 441,-595, filed July 6, 1954.

The present invention relates to a radiation amplifier construction and more particularly to a solid-state amplifier for reproducing a radiation image.

In Orthuber continuation-in-part application Serial No. 332,733, filed January 22, 1953; Ullery application Serial No. 362,204, filed June 17, 1953; and Orthuber et al. application Serial No. 409,982, filed February 12, 1954, different arrangements of a display amplifying device similar to this invention are disclosed and claimed. This display-amplifying device was embodied in a laminated cell construction in which the laminae, for all practical purposes, were arranged in the manner of an ordinary parallel-plate condenser having a dielectric material interposed between the two plates. The plates of the condenser were composed of electrically conducting material, such as metal, in such thin films as to be transparent. The dielectric was comprised of two parts: viz., a lamina of photoconductive material, such as cadmium sulphite, having high dark electrical impedance and a contiguous lamina of electroluminescent material which may be excited to luminesce by the application thereto of a variable electric field. A typical suitable material for this electroluminescent lamina is a copper activated zinc oxide and zinc sulphide mixture as explained by Destriau in the 1937 edition, vol. 38, of Philosophical Magazine, on pages 700–739, 774–793, and 800–887. Other suitable materials are also described in Patents Nos. 2,566,349 and 2,624,857. Since the publication of this Destriau article, considerable developmental efforts have been expended in refining such electroluminescent materials for such purposes as illuminating rooms much in the same manner as is accomplished by conventional incandescent lamps. Materials used for lighting may be adapted to this invention in the light of the teaching of the above-mentioned applications and the present following disclosure.

With the application of an exciting alternating voltage to the two plates of the above-described display amplifier, a voltage drop may be considered to exist therebetween which is the sum of the two voltage drops occurring across the respective two dielectric layers. By designing these dielectric layers in a predetermined manner, the electroluminescent material may be prevented from luminescing in the absence of exciting light, but, on the other hand, caused to luminesce when light energy is projected onto the photoconductive layer. During this latter condition, the electrical characteristics of the photoconductive layer are so changed as to alter the distribution of voltages across the two layers in a direction to increase the magnitude of the voltage applied to the electroluminescent layer. With this increase of voltage, the electroluminescent layer will emit light of such brightness as corresponds to the change in electrical characteristics of the photoconductive layer.

Such an amplifier cell has particular utility in the reproduction of television and motion picture displays.

This cell provides amplification of the image projected upon it, whereby an image of low brightness content produced by a relatively small television picture tube may be magnified many times and reproduced in highly brightened condition for clear observation.

Reproduction characteristics of this amplifier are dependent in part upon the design of the various laminae. Thus, by varying certain structural features, corresponding variations of reproduction chacteristics may be achieved.

It has been found in fabricating working embodiments of the foregoing inventions that some difficulty is encountered in achieving intimate electrical contact between the phosphor and photoconductive layers. In the absence of such intimate contact, air gaps or void spaces of minute character exist between the two layers and introduce impedance effects which deleteriously interfere with efficient operation.

In view of the foregoing, it is an object of this invention to provide a radiation amplifier which assures intimate contact between the phosphor and photoconductive layers.

It is another object of this invention to provide a phosphor layer assembly which is flexible in such a manner as to be conformable to any irregularities existing in the contiguous surface of the photoconductive layer.

In accordance with the present invention, there is provided a radiation amplifier which includes a photoconductive voltage-controlling electrode assembly having a contact surface, and a luminescing layer electrode comprised of electroluminescent phosphor material which is formed into intimate electrical contact with said contact surface. Such intimate contact prevents the inclusion of air gaps or void spaces which interfere with efficient operation of the amplifier.

In the accompanying drawings:

Fig. 1 is a cross-sectional view in diagrammatical form of one embodiment of this invention;

Fig. 2 is an equivalent circuit diagram used in explaining the operation of the invention;

Fig. 3 is an elevational view of the embodiment of Fig. 1;

Fig. 4 is an enlarged fragmental cross-section of a specific embodiment of this invention; and Fig. 5 is a similar cross-sectional view taken substantially along section line 5—5 of Fig. 4.

Referring to Fig. 1 of the drawings, the display amplifier is comprised of a laminated assembly of planar construction and is of suitable configuration, such as square, as illustrated by Fig. 3.

The laminations of this assembly comprise a glass or the like supporting plate 1, a transparent film of conductive material 2, such as evaporated silver applied to one side of the plate 1, a layer 3 of photoconductive material (cadmium sulphite, for example), a layer of electroluminescent material 4 contiguous with the layer 3, another film 5 of conductive material which may be identical with the material film 2, and a second-supporting glass plate 6 which carries the film 5. A light-attenuating insulation lamina (not shown) may be interposed between the layers 4 and 5 for limiting light-feedback between these layers.

The equivalent electrical circuit of this assembly is represented by Fig. 2. The resistor, generally indicated between reference numeral 7, is comprised of the film electrode 2 and the photoconductive material 3, and the condenser, generally indicated by the reference numeral 8, is comprised of the electroluminescent layer 4 (the dielectric) and the film electrode 5. By application of an alternating exciting voltage of, for example, 600 volts at 800 cycles, across the two electrodes 2 and 5 as shown, a certain distribution of voltages or voltage division will occur over the two components 7 and 8, since they are connected in series. At first, if it is assumed that the components 7 and 8 are subjected to a condition of "no light" (in other words, placed in a completely darkened room), a certain voltage division will be obtained as indicated by the symbols V1 and V2, respectively. The sum of these voltages V1 and V2 equal the applied voltage "V." Now, if it is assumed that the photoconductive material of the resistor 7 is illuminated, the impedance characteristics of this material will correspondingly change, thereby altering this division of voltages. Since illumination tends to lower the impendance of the photoconductive material 3, an increase of voltage will be applied to the layer 4. This layer (condenser 8) thereupon luminesces with a brightness dependent upon the magnitude of the alternating voltage (V2) applied thereto, so it becomes apparent that as the impedance of the component 7 decreases, the electroluminescent material 4 tends to luminesce. It is important that the photoconductive layer 3 possesses a relatively low capacity. Similarly, the dark-resistance of this layer 3 should be high. With the impedance properly designed, the division of voltages across the two components 7 and 8 will be such as to impose substantially all of the voltage across resistor 7 and a very small voltage across the condenser 8 during "no light" conditions. By assuring that this latter voltage is sufficiently small, the electroluminescent lamina 4 will not luminesce. Now, assuming the condition of projecting incident light on the layer 3 of progressively increasing brightness, the impedance across the layer 3 will correspondingly decrease thereby altering the division of voltages across the components 7 and 8 in a direction to increase the voltage across the electroluminescent material 4. When the threshold of luminescent sensitivity is reached, the lamina 4 will luminesce to a degree dependent upon the magnitude of the voltage impressed thereover.

Since the elemental areas of the contiguous layers 3 and 4 may be considered as series-connected impedances, it is important that no impedances other than these elemental portions be included in the series circuit. Such unwanted impedances do occur by reason of improper or non-uniform contact over the contiguous surfaces of the layers 3 and 4 of such nature that air gaps or void spaces will exist therebetween. These air gaps and spaces constitute third impedances connected in series with the circuit of Fig. 2 which interfere with the proper distribution of exciting voltages between the circuit elements 7 and 8. It will be explained in the following how these air gaps and void spaces may be avoided to improve operation of the invention.

In particular, the layer 4 of phosphor particles is preferably only about one-mil in thickness. The electrode film 5 is evaporated and is transparent, and consequently is of negligible thickness. The glass plate 6 however, differs from anything suggested by the preceding applications as mentioned hereinbefore in that it is constituted of a thin film or membrane of glass of approximately five to ten mils in thickness. Such glass or equivalent plastic material may be flexed without breakage. The phosphor sub-assembly comprised of the layers 4, 5 and 6, because of its thickness may obviously be flexed into intimate contact with any irregularities which may exist in the contiguous surface of the layer 3. Various methods and devices may be employed for flexing this assembly 4, 5 and 6 into intimate contact with the layer 3 and suitable techniques are explained in the following.

The phosphor particles comprising the layer 4 may be suspended in a plastic substance such as polystyrene which is allowed to almost harden prior to application to the layer 3. Just prior to complete hardening, the assembly 4, 5 and 6 is superimposed on the layer 3 and pressure is applied over the entire surface of the plate 6 forcing the plastic layer 4 onto the adjacent surface. By this means, the layer 4 will make intimate contact with the entire contiguous surface of the layer 3, and thereby exclude air gaps or unwanted void spaces.

Uniform pressure may be applied to the plate 6 by means of a suitable roller or the like. Other methods of applying pressure will appear obvious to a person skilled in the art.

A more specific amplifier construction is illustrated in Figs. 4 and 5 wherein the supporting plate 1 is provided with a plurality of parallel spaced grooves 9 having metallic strip conductors in the apices thereof. These strip conductors 10 are electrically connected together as shown and correspond to the electrode element 2 of Fig. 1. A layer of photoconductive material 11 is deposited on the opposite surfaces of all of the grooves 9 and preferably consists of cadmium sulphite evaporated to a thickness of from about one to twenty microns. A plurality of contact segments 12 made of suitable conductive material such as metal are adhered to the inner surface of the plate 1 between adjacent grooves 9, as seen more clearly in Fig. 5. These segments 12 are spaced apart to provide insulating spaces 13, such that each segment 12 may correspond in size to an elemental area of an image to be reproduced. The particular size of each segment 12 will vary according to the overall size of the amplifier with smaller segments producing higher picture resolution for a given size amplifier.

The phosphor layer 4 is laid against the segmented surface 12. A flexible glass membrane 6 carries this phosphor layer 4 as previously described with the film electrode 5 being interposed therebetween.

A layer 14 of non-hardenable plastic material such as poly iso-butylene is contiguous with the glass membrane 6 and a rigid glass reinforcing plate 15 of suitable thickness is laid against this plastic layer 14. By applying uniform pressure over the lower surface of the glass plate 15, as viewed in Fig. 4, the plastic material 14 will transmit this pressure to the flexible membrane 6 and thereby force the phosphor layer 4 into intimate contact with each and every segment 12. Thus, the segments 12 need not be exactly coplanar but may be irregular over the entire surface thereof. By reason of the flexibility of the phosphor assembly 4, 5, and 6, the phosphor may be forced into intimate contact with the entire surface of each segment 12 and thereby eliminate the possibility of air gaps and void spaces.

This embodiment of Fig. 4 operates, as explained in the previously mentioned applications; however, it may be explained briefly that a ray of light 16 indicated by the dashed line impinging the photoconductive material 11 will serve to reduce the impedance of the latter between the adjacent strip electrode 10 and contact segment 12. This results in an increase of voltage between the particular contact 12 and the film electrode 5 for causing luminesence of the phosphor material contiguous with the particular contact segment 12.

Another method for eliminating the possibility of air gaps and void spaces includes sealing the lateral edges of the amplifier as illustrated in Fig. 3, but leaving one small opening in the edge through which air pressure inside the amplifier may be reduced. The construction of Figs. 4 and 5 is particularly adaptable to this reduced pressure technique, each of the grooves 9 preferably being connected to an exhaust pump for reducing the air pressure therein. Atmospheric pressure will thereupon force the phorphor assembly 4, 5 and 6 into intimate contact with each of the segments 12 as explained previously.

While other methods of producing intimate contact between the phosphor layer 4 and the segments 12 will now appear obvious to persons skilled in the art, the different methods explained in the foregoing provide basis for general coverage of the invention. It is intended to cover by the appended claims such methods as will obviously occur to persons skilled in the art from the teachings of the foregoing.

While there has been described what is at present considered the preferred embodiments of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A solid-state radiation amplifying device comprising: a transparent supporting plate having a plurality of longitudinally extending, parallel, spaced-apart, substantially V-shaped grooves formed in one side thereof, said grooves defining parallel flat surfaces therebetween; conductive material disposed in the apices of said grooves; a thin layer of photoconductive material on the opposite surfaces of said grooves; each of said parallel surfaces having contact means formed of a thin layer of conductive material disposed thereon; and a layer of electroluminescent material abutting said contact means, said electroluminescent layer being carried by a membrane of flexible, transparent insulating material with a film of conductive material interposed between said electroluminescent layer and said membrane whereby said electroluminescent layer is urged into intimate contact with said contact means.

2. A solid-state radiation amplifying device comprising: a transparent supporting plate having a plurality of longitudinally extending, parallel, spaced-apart, substantially V-shaped grooves formed in one side thereof, said grooves defining parallel flat surfaces therebetween; conductive material disposed in the apices of said grooves; a thin layer of photoconductive material on the opposite surfaces of said grooves; each of said parallel surfaces having a plurality of spaced-apart contact segments formed of a thin layer of conductive material disposed thereon; and a layer of electroluminescent material abutting said contact segments, said electroluminescent layer being carried by a membrane of flexible transparent insulating material with a film of conductive material interposed between said electroluminescent layer and said membrane whereby said electroluminescent layer is urged into intimate contact with said contact segments.

3. A solid-state radiation amplifying device comprising: a transparent supporting plate having a plurality of longitudinally extending, parallel, spaced-apart, substantially V-shaped grooves formed in one side thereof, said grooves defining parallel flat surfaces therebetween; conductive material disposed in the apices of said grooves; a thin layer of photoconductive material on the opposite surfaces of said grooves; each of said parallel surfaces having contact means formed of a thin layer of conductive material disposed thereon; a layer of electroluminescent material abutting said contact means, said electroluminescent layer being carried by a membrane of flexible, transparent insulating material with a film of conductive material interposed between said electroluminescent layer and said membrane whereby said electroluminescent layer is urged into intimate contact with said contact means; a nonhardenable plastic material applied over said membrane, and a reinforcing rigid plate engaging said plastic material so that uniform pressure applied to said plate and transmitted by said plastic material to said membrane will distort the latter to provide said intimate contact.

No references cited.